(12) United States Patent
Rusconi

(10) Patent No.: US 9,347,594 B2
(45) Date of Patent: May 24, 2016

(54) HYDRAULIC CONNECTION ASSEMBLY WITH PRESSURE DISCHARGE CONTROL

(75) Inventor: Paolo Rusconi, Rivolta D'Adda (IT)

(73) Assignee: Faster S.P.A., Milan (IT)

( * ) Notice: Subject to any disclaimer, the term of this patent is extended or adjusted under 35 U.S.C. 154(b) by 519 days.

(21) Appl. No.: 13/066,331

(22) Filed: Apr. 12, 2011

(65) Prior Publication Data

US 2011/0254265 A1    Oct. 20, 2011

(30) Foreign Application Priority Data

Apr. 16, 2010   (EP) .................................. 10425121

(51) Int. Cl.
| | |
|---|---|
| *F16L 37/35* | (2006.01) |
| *F16L 37/23* | (2006.01) |
| *F16L 37/32* | (2006.01) |
| *F16L 37/56* | (2006.01) |
| *E02F 9/22* | (2006.01) |

(52) U.S. Cl.
CPC ................. *F16L 37/32* (2013.01); *F16L 37/56* (2013.01); *E02F 9/2275* (2013.01); *F16L 2201/20* (2013.01)

(58) Field of Classification Search
USPC .............. 137/563, 613, 614, 614.03, 614.04, 137/614.05, 312, 594, 597; 251/149.1, 251/149.6; 285/13, 14, 924
See application file for complete search history.

(56) References Cited

U.S. PATENT DOCUMENTS

| | | | | | |
|---|---|---|---|---|---|
| 2,638,915 | A | * | 5/1953 | Mitchell | 137/599.02 |
| 4,444,223 | A | * | 4/1984 | Maldavs | 137/614.04 |
| 4,610,470 | A | * | 9/1986 | Perrine et al. | 285/321 |
| 5,063,965 | A | * | 11/1991 | Wilcox | 137/614.03 |
| 6,116,277 | A | * | 9/2000 | Wilcox et al. | 137/614.02 |
| 6,655,656 | B2 | * | 12/2003 | Maldavs | 251/149.6 |
| 6,776,187 | B1 | * | 8/2004 | Marquis et al. | 137/614.04 |
| 6,814,340 | B2 | * | 11/2004 | Arosio | 251/149.1 |
| 7,007,983 | B2 | * | 3/2006 | Arosio | 285/316 |
| 7,198,060 | B2 | * | 4/2007 | Hiser | 137/495 |
| 7,815,169 | B2 | * | 10/2010 | Arosio | 251/149.6 |
| 2004/0144436 | A1 | * | 7/2004 | Zeiber et al. | 137/864 |

FOREIGN PATENT DOCUMENTS

| | | |
|---|---|---|
| DE | 202008017401 | 7/2009 |
| EP | 1431648 | 6/2004 |
| WO | WO 0028255 | 5/2000 |
| WO | WO 2008012293 | 1/2008 |

\* cited by examiner

*Primary Examiner* — Stephen M Hepperle
*Assistant Examiner* — Frederick D Soski
(74) *Attorney, Agent, or Firm* — Stetina Brunda Garred & Brucker

(57) ABSTRACT

An hydraulic connection assembly for connecting one or more hydraulic lines may have a one-block body enclosing one or more hydraulic lines and at least one draining line connected to said hydraulic lines. The assembly may also have at least one coupling provided with an axially movable element adapted to actuate a sealing member to allow discharge of fluid pressure and relieve pressure from the tool lines before disconnecting or to facilitate maneuvering of connecting lines. The assembly also reduces the production costs and time, as well as the threes that the operator must apply when engaging pressurized lines.

8 Claims, 5 Drawing Sheets

HYDRAULIC CONNECTION ASSEMBLY WITH PRESSURE DISCHARGE CONTROL

The present invention relates to a hydraulic connection assembly equipped with pressure discharge means.

Hydraulic assemblies adapted to connect an onboard hydraulic circuit of an operating machine to the hydraulic circuit of movable hydraulic equipment are known from the prior art. An example of use of these hydraulic connection assemblies is that of earth-moving machines, such as diggers or the like, which are provided with an onboard hydraulic circuit for actuating the machine members, and usually have the possibility of connecting said onboard circuit to movable hydraulic equipment, such as for example pneumatic drills, cutters and similar tools, by the connection to the hydraulic onboard circuit with flexible tubes and quick couplings.

The hydraulic connection of a tool to a machine is not however free from drawbacks. A first drawback concerns the onboard hydraulic system remaining under pressure when the equipment is disconnected.

This entails the tool circuit being full of fluid when the tool is disconnected and stored after use.

The hydraulic circuit of the tool remaining full of fluid is a source of danger if, as habitually occurs, the equipment is left after use at a construction site, often exposed to the sun or, in all cases, to the action of elements which may determine an increase of the internal temperature, and thus of pressure, in the hydraulic circuit of the tool. This pressure increase in the tool, in addition to being dangerous because per se as it may damage the equipment itself, it is also disadvantageous and thus should be avoided, because it considerably increases the force that the user must apply to connect the tool back to the machine, to the extent of making it sometimes insurmountable. In general, as mentioned, such a connection is carried out by means of one or more quick couplings, which require the operator to connect the tool line semi-coupling to the corresponding semi-coupling of the connection assembly provided on the machine, by means of a pressure movement in the axial direction. The presence of pressurized fluid in the tool may so require a coupling force of several tens of kilograms, which is too high for the user to establish the connection.

For this reason, connection assemblies which include decompression means on the lines are known on the market in order to obviate these drawbacks.

An example of these systems of the type known from the prior art is provided by international patent application WO2008/012293, which shows a hydraulic connection assembly comprising a one-piece body externally attachable to the operating machine and provided with a hydraulic coupling connectable to a pressure line of the hydraulic circuit of the machine for feeding a removable equipment, and an auxiliary pressure discharge device connectable to a draining line. When connected to the hydraulic assembly, the auxiliary discharge device is interposed between the pressure feeding line of the circuit and the draining line, and comprises an exhaust valve provided with an opening control manually actuated by the operator to discharge the pressure from the machine line.

The discharge valve is of the sliding-piston type and the pressure discharge control consists of a lever with may be moved by the user between a resting position and a working position.

A drawback which afflicts this solution of type known from the prior art consists in that the user must manually actuate the pressure discharge control to release the pressure from inside the circuit, and therefore the operator must remember to carry out this operation when disconnecting the equipment to release the pressure from the hydraulic circuit of the equipment.

A further drawback of this device known from the prior art is its structural complexity, resulting in a high production cost of the hydraulic assembly.

Not least, the structural complexity of the device and the presence of a plurality of pipes inside the cast-iron containing block of the quick couplings limits the maximum fluid pressure value. Indeed, the tightness of the whole assembly is limited in that the pressurized fluid is forced to flow within through ports obtained in the cast-iron body.

Further solutions known from the prior art for establishing the hydraulic connection between the onboard circuit of an operating machine and an apparatus include the use of quick couplings provided with movable elements capable of acting as pressure releasing devices, thereby reaching a high degree of automation of the pressure release device, which is not manually actuated by the operator intervening on a separately positioned control device, but is instead included in the couplings themselves, thereby being automatically actuated by the operator with the same axial thrust used for the steps of engaging and disengaging.

As example of such a technical solution is disclosed in patent EP1179701 by the same applicant, in which a hydraulic coupling adapted to be inserted into a cast-iron block of the type shown in international patent application WO2008/012293 is described and claimed, comprising a movable element provided with a decompression valve, which is opened when said element reaches a stroke-end position upon an axial thrust by the operator, which intentionally extends the engagement action for actuating the decompression device.

Such a technical solution leaves some drawbacks unsolved, even if it considerably simplifies the decompression device as compared to the teaching of application WO2008/012293 by incorporating such a decompression device in the couplings, and thus obtaining the further advantage of allowing to actuate the decompression by means of the same maneuvre of engaging the connections.

One of these drawbacks consists of the difficulty in making the movable elements, in particular the decompression valves, which need to be assembled by hand because of their small size. The production costs are thus spoiled by the need to manually assemble very small parts.

A further drawback which afflicts the connection assembly with a decompression device of the illustrated type consists in the high force that the operator must apply to establish the connection of the hydraulic lines of the tool to the couplings of the connection assembly in the presence of residual internal pressure, as well as to decompress them. As explained in greater detail below, FIGS. 1 and 2 show quick couplings, 100 and 200 respectively, inserted into the one-block body A of the device of the prior art closest to the object of the present invention. As apparent, the movable element of the couplings may axially shift with respect to the one-block body A made of cast-iron, and the outermost part of the movable element slides in contact with the inner part of said one-block body A, one or more seals 101, 201 being provided to ensure fluid-tightness between the coupling and the one-block body A. Due to the porosity of the cast-iron of the one-block body A, the sliding friction coefficient of the seals 101 and 201 is very high, and this results in a high value of the force needed to decompress the lines, and upon a number of non-satisfactory cycles, a wear of the seals themselves, which could cause the gradual loss of hydraulic tightness, with the consequent need to replace the whole device, or at least the whole coupling.

In order to attempt to reduce these drawbacks, after the galvanization process, the one-block assembly A is subjected to lapping of the inner surface, so as to reduce the porosity thereof, and thus the friction coefficient for the seals. The need to proceed with this further mechanical surface machining implies an increase of production costs, as well as increasing production times. Indeed, the one-block body must go back to the machine tool working station to lap the inner surfaces after it has undergone galvanization. In addition to causing a considerable increase of production costs, the lapping process after galvanization thus extends the time for manufacturing the device.

Not last it has been regretfully found that even poceeding with the utmost care and monitoring the production process adopting the necessary quality measures, lapping frequently does not respect the constructional requirements, with the consequence that unfortunately some devices do not satisfy product specifications in terms of the required force for engagement, It is thus particularly felt the need to provide a hydrulic connection assembly of the one-block type which allows to overcome the drawbacks afflicting the devices of known type of the prior art.

It is thus the main task of the present invention to provide a hydraulic assembly for connecting the hydraulic line of a tool to a hydraulic circuit which allows to reduce the force that the operator must apply to decompress the lines, the fluid pressure in the circuit being equal.

Within the scope of this task, it is the object of the present invention to provide a hydraulic connection assembly which has a greater constructional simplicity, which allows per se to increase reliability and to decrease costs and production times.

It is a further object of the present invention to provide a hydraulic assembly which allows to reduce the requisite number of production process operations, in particular simplifying the steps of machining and treating the one-block assembly made of cast-iron by completely eliminating the step of lapping the inner surfaces, thus obtaining also in this case a two-fold advantage in terms of production costs reduction and faster production process.

A not last object of the present invention is to provide a hydraulic assembly having a higher working and burst pressure, thus raising the safety standard of the device.

Again, it is an object of the present invention to provide a hydraulic assembly adapted to connect couplings of different sizes.

This task and these and other objects, which will be explained in greater detail below, are achieved by a hydraulic connection assembly for connecting one or more hydraulic lines, of the type comprising a mono-block body enclosing one or more hydraulic lines and at least one draining line connected to said hydraulic lines, further comprising a coupling on at least one of said hydraulic lines, provided with an axially movable element adapted to actuate said line decompression means, characterized in that said decompression means comprise at least one sealing member positioned on said movable element and adapted to hydraulically seal said movable element against a fixed member of said coupling, and at least one or more niches obtained on said fixed member of the coupling, so that said element is movable between a first working position, in which said sealing member hydraulically seals against said fixed member, and a second decompressing position in which said sealing member is positioned at one or more niches, non longer hydraulically sealing, while allowing the passage of fluid to said draining line.

Further features and advantages of the present invention will be more apparent from the following detailed description provided by way of non-limitative example and shown in the accompanying drawings, in which.

According to a preferred embodiment of the present invention shown by way of non-limitative example in the mentioned figures, the hydraulic assembly 1 according to the present invention comprises a one-block body A, in which at least two couplings are usually accommodated.

Indeed, the hydraulic assembly according to the present invention is intended to connect the hydraulic lines of a tool to the onboard hydraulic circuit of an operating machine, for example, and a feeding or delivery line 2 and a return line 3 are therefore normally provided. The hydraulic delivery and return lines 2 and 3 identified inside the one-block body A are associated with quick couplings 5 and 6, respectively, for connecting the hydraulic lines of the tool, not shown in the figures. By means of inner ports of the one-block body A, 2*a* and 3*a* respectively, the delivery and return lines 2 and 3 of connection 1 are connected to a draining line 4 of the hydraulic circuit.

While the delivery and return lines 2, 3 are connected to the respective pressure lines of the onboard hydraulic circuit of the operating machine, for example, the draining line 4 is connected to a reservoir for storing the liquid in the circuit.

By means of the quick couplings 5 and 6, the hydraulic lines 2 and 3 may be connected, as mentioned, to the hydraulic lines of the tool, i.e. of the hydraulic equipment in the case of an equipment to be connected to an operating machine. The hydraulic assembly according to the present invention further comprises means for discharging the hydraulic pressure. In particular, said hydraulic pressure discharge means are included in each of said couplings 5 and 6, so that the operator can independently discharge pressure from the feeding line 2 and/or into the return line 3, i.e. by operating the mentioned discharge means provided on each of the two lines.

Passing now to a detailed description of the connection couplings 5 and 6 of the hydraulic lines, it is noted that the structure of the movable element and of the coupling portion within the one-block body A of the two couplings are substantially identical, while the two male and female 5 and 6 couplings differ only for the portion protruding from the one-block body A for the physical connection to the lines of the tool.

By virtue of this substantial symmetry of the two couplings, they will be described with particular reference to the enlargement in FIG. 4, which shows one of the two couplings in greater detail.

Figure 4:
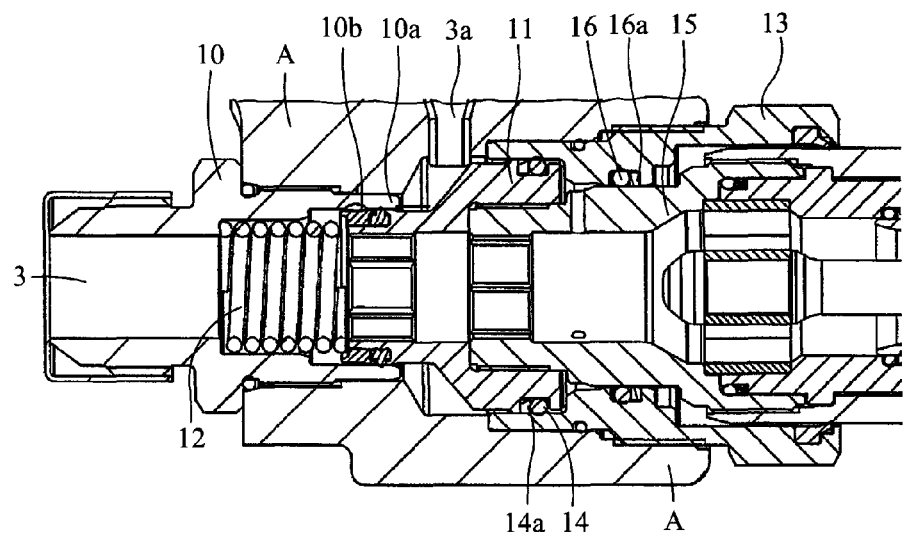
FIG. 4 shows a detail of the coupling in FIG. 3.

Therefore, with particular reference to FIG. 4, each of the couplings of the connection assembly according to the present invention comprises an adapter 10, having a substantially hollow cylindrical shape, axially defining the hydraulic return line 3, which is firmly associated, by screwing for example, with the lower part of said one-block assembly A at the hydraulic line being coaxial thereto. Rear part of the one-block assembly means the part opposite the front part, the front part being the one from where the couplings for the connection to the tool protrude.

Each of the couplings further comprises a rear body 11 slidingly associated with said adapter 10. In particular, adapter 10 has a substantially axial, inner port in which there are accommodated said rear body 11, a helical spring 12 acting between said rear body 11 and a locator specifically provided at the inner port of said adapter and capable of generating a force which opposes the reciprocal approaching of the two elements, i.e. the interpenetration of the rear body 11 within the adapter 10.

Because the rear body 11 is partially inserted into the adapter 10 and slidingly associated therewith, there is always a portion 10a of the adapter 10 which peripherally surrounds the rear body 11, also substantially cylindrical and provided with an axial port for the fluid passing. On the inner surface of said portion 10a of adapter 10 one or more grooves 10b are obtained, which thus face the outer surface of said rear body 11.

The rear body 11 belongs to a movable element of the coupling because it is axially movable between first and second positions, as described in greater detail below. The movement of the rear body 11 towards the adapter 10 is opposed by the presence of the helical spring 12, while it may be pushed towards the rear part of the one-block body A, thus compressing the spring 12, when the operator decides to manually push the coupling in the axial direction.

Indeed, said rear body 11 is axially restrained by a ring nut 13, which is firmly connected to the front part of said one-block body A, coaxially to the hydraulic line 3. According to the preferred embodiment shown in the accompanying figures, the ring nut 13 is threaded to the one-block body A.

A sealing member 11a, capable of radially protruding outwards so as to hydraulically seal against the inner surface of the end portion 10a of adapter 10 is provided on the rear portion of body 11, which is engaged inside adapter 10.

Said sealing member 11a preferably consists of an annular seal made of polyurethane or similar material, having an appropriately shaped profile, with the sealing zone having a cusp which optimizes sealing and minimizes friction.

Said sealing member 11a is kept in a seat appropriately obtained on the outer surface of the rear body 11 by the presence of a metal ring, which restrains the seal itself inside its housing. The stability of the seal in the seat thereof is further ensured by a shape-coupling between the seal and seat thereof.

The ring nut 13 is also axially symmetric to the longitudinal axis of the coupling and has an inner diameter for axially driving the inner body 15. Furthermore, the threaded ring nut has a substantially cylindrical portion 13a, intended to peripherally envelop the rear body 11, which is thus sliding with respect to the ring nut 13. The hydraulic seal between the outer surface of the rear body 11 and the inner surface of the portion 13a of the ring nut 13 is ensured by the presence of a sealing element 14, typically an O-ring, and by a specific anti-extrusion ring 14a.

In brief, the rear body 11 is axially movable, having its movements restrained by the back contact with the adapter 10 and by the front contact with the ring nut 13.

A further element, i.e. the inner body 15, completes the coupling part within the one-block element A. The inner body 15 is coaxially arranged to the other elements, is inserted inside the ring nut 13 and partially interpenetrates said rear body 11 with a portion. The inner body 15 is thus firmly connected, in the example by screwing, to the rear body 11.

Figure 6:
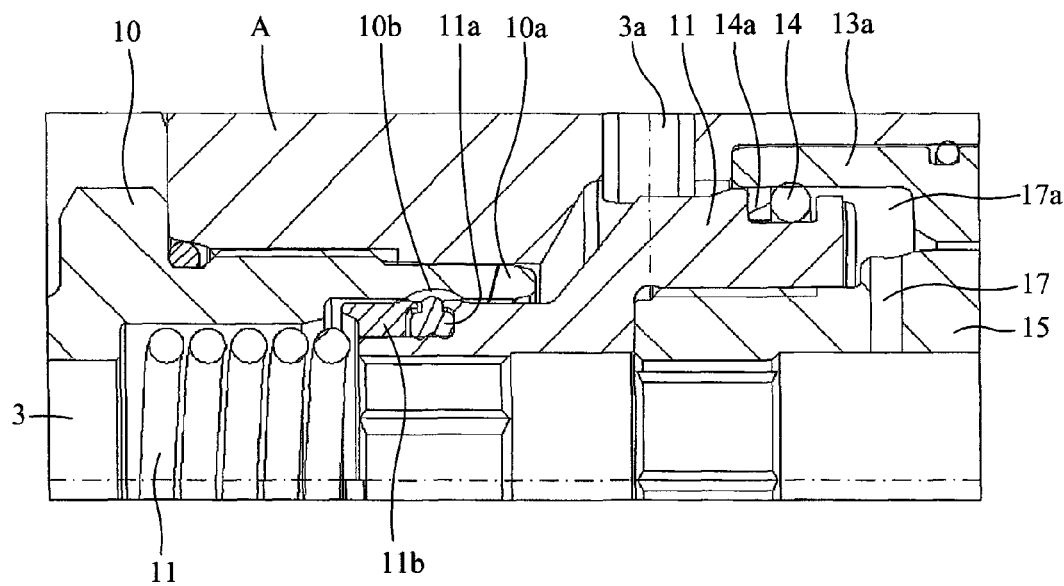
FIG. 6 shows the same enlargement of the coupling in FIG. 5 in a second decompressing position, in which the fluid is free to pass from the axial hydraulic line to the decompression line.

The hydraulic seal between the outer surface of the inner body 15 and the inner surface of the ring nut 13 is ensured by a sealing member 16, typically an O-ring, and by a specific anti-extrusion ring 16a. A substantially radial connection pipe 17 adapted to establish a communication between inner port of the inner body 15 and a fluid storing chamber 17a, shown in better detail in FIG. 6, is provided at the peripheral wall of the inner body 15. Said chamber 17a is delimited by the inner body 15, the ring nut 13 and the rear body 11, the hydraulic seal which prevents the dispersion of the fluid being also ensured by the sealing member 14 and by a specific anti-extrusion ring 14a.

The operation of the coupling assembly according to the present invention will now be described with particular reference to FIGS. 5 and 6, which show the movable element of a coupling in a first working position and in a second pressure discharging position, respectively.

Figure 5:
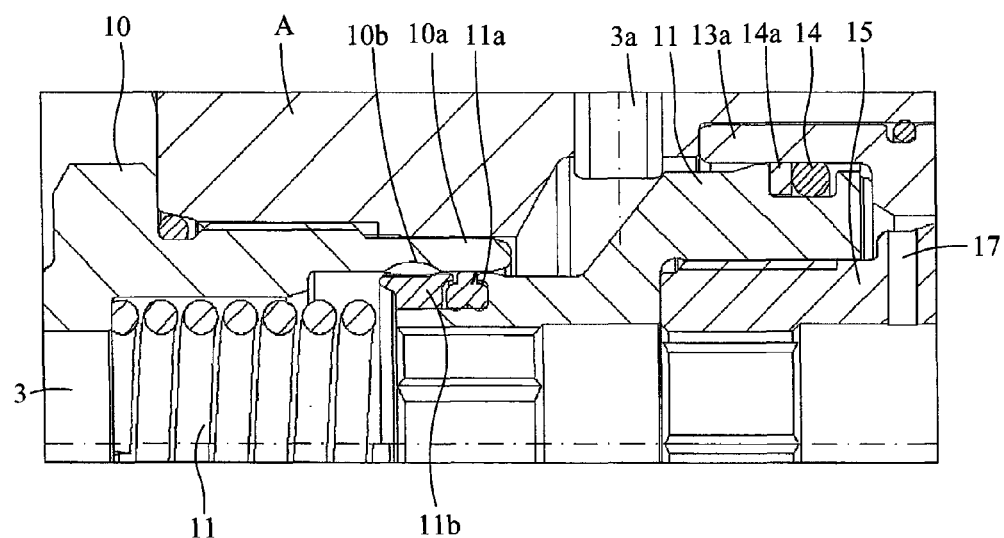
FIG. 5 shows the coupling in FIG. 3 in a first working position, in which the fluid in the line crossing the coupling may be pressurized.

When the movable element, essentially consisting of the rear body 11 and the inner body 15 are in the working position in FIG. 5, the hydraulic line 3 of the feeding assembly puts the hydraulic feeding circuit of the operating machine into communication with the possible tool. Also if no tool is connected to the coupling 6 of the feeding assembly, the movable element is in the position shown in FIG. 5. When the line needs to be decompressed, the operator only needs to exert a further pressure in the axial direction on the coupling, causing the over travel of the inner body 15, which in turn pushes the rear body 11 towards the rear zone of the one-block body A, until the movable element is in the configuration shown in FIG. 6, in which it reaches its stroke-end position.

When the movable element shifts to reach the stroke-end position in FIG. 6, the polyurethane sealing member 11a slides over a few millimeters inside the end portion 10a of the adapter 10, again ensuring hydraulic sealing, until said seal 11a reaches the niches or decompression grooves 10b obtained on the inner surface of said adapter 10.

At this point, again with reference to FIG. 6, the seal 11a is at the niche 10b and thus no longer ensures hydraulic sealing against the adapter 10. The pressurized fluid from line 3 may thus flow towards the through port created between the seal 11a and the decompression niche 10b, thus reaching the discharging line 3a, and through the latter, the draining line 4. Pressurized fluid is so dischargd through the draining line, and therefor the pressure is reduced in the line, in this case in the return line 3.

As mentioned, the translation of the movable element is allowed by virtue of the presence of the connection pipe 17, which allows the incompressible fluid, typically oil, to flow out into the storing chamber 17a when the movable element moves from the resting position to the decompressing position. Similarly, during the translation movement in the opposite direction, which returns the movable equipment from the decompressing position of the working position, and thus of sealing of seal 11a, the fluid is recalled by the storing chamber 17a inwards the coupling through the connection pipe 17.

The operation of the coupling 5 on the delivery line 2 is the same as shown with reference to the coupling 5 of the return line 3.

Furthermore, the coupling assembly according to the present invention allows to associate the male and female couplings 5 and 6, which are interchangeable and in compliance with standard ISO 16028, to the hydraulic lines of tools of different diameters, thus including appropriate adapters to be associated with the one-block body A.

The connection assembly according to the present invention thrust comprises means for decompressing the lines thus preserving an extremely simple structure. In particular, the decompression of the fluid is obtained using means which do not require manual assembly nor are particularly complicated from an engineering point of view.

Furthermore, with particular reference to FIGS. 4, 5 and 6, it is noted that the components of the movable element essentially consist of the inner body 15 and the rear body 11, not in contact with the one-block body A. Therefore, in the connection assembly according to the present invention, there are no moving components in contact with the cast-iron structure of the one-block body A, thereby obtaining multiple advantages.

A first advantage is related, as mentioned, to the reduction of production times and costs, because surface polishing, in particular lapping, of the inner surfaces of the one-block body is not longer needed, as it was instead in the known solutions of the prior art to reduce material porosity, in order to reduce friction while increasing the average life of the sealing members sliding in contact with the one-block body. A further advantage is indeed given by the decrease of thrust that the operator must exert to decompress the line.

Indeed, in the assembly according to the present invention, precisely by virtue of the rear body 11 being axially movable and sliding partially in contact with the adapter 10, partially in contact with the ring nut 13, while the other movable element (the inner body 15) slides in contact with said ring nut 13, there is no movable element sliding in contact with the one-block body A.

Figure 1:
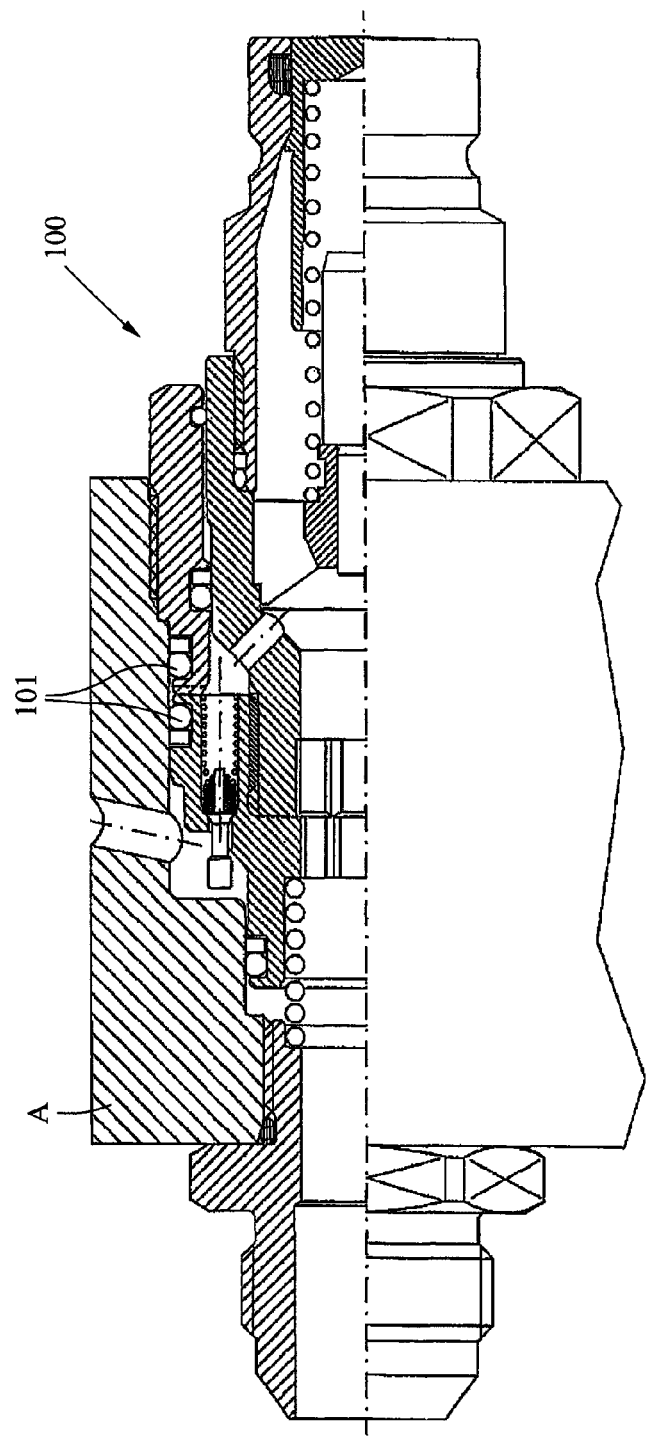
FIG. 1 shows a partially sectioned side view of a first coupling belonging to a device of the type known from the prior art closest to the object of the present invention.
Figure 2:
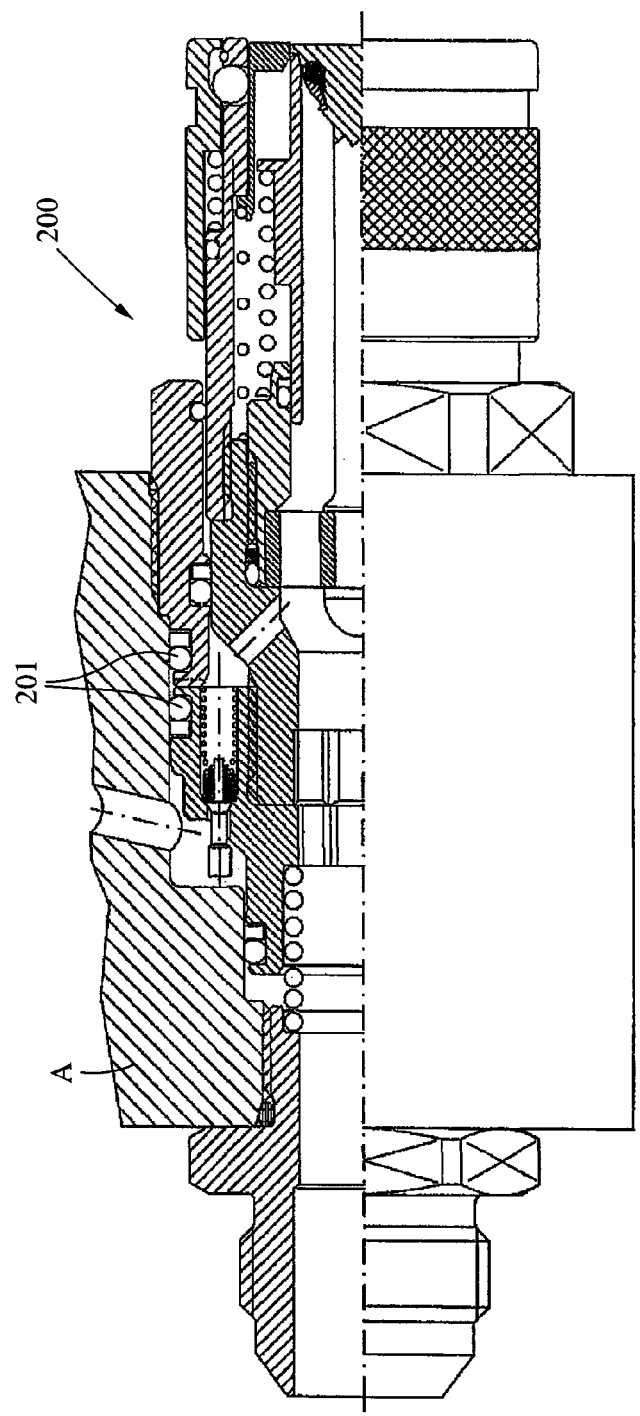
FIG. 2 shows a partially sectioned side view of a second coupling belonging to the type known from the prior art closest to the object of the present invention.
Figure 3:
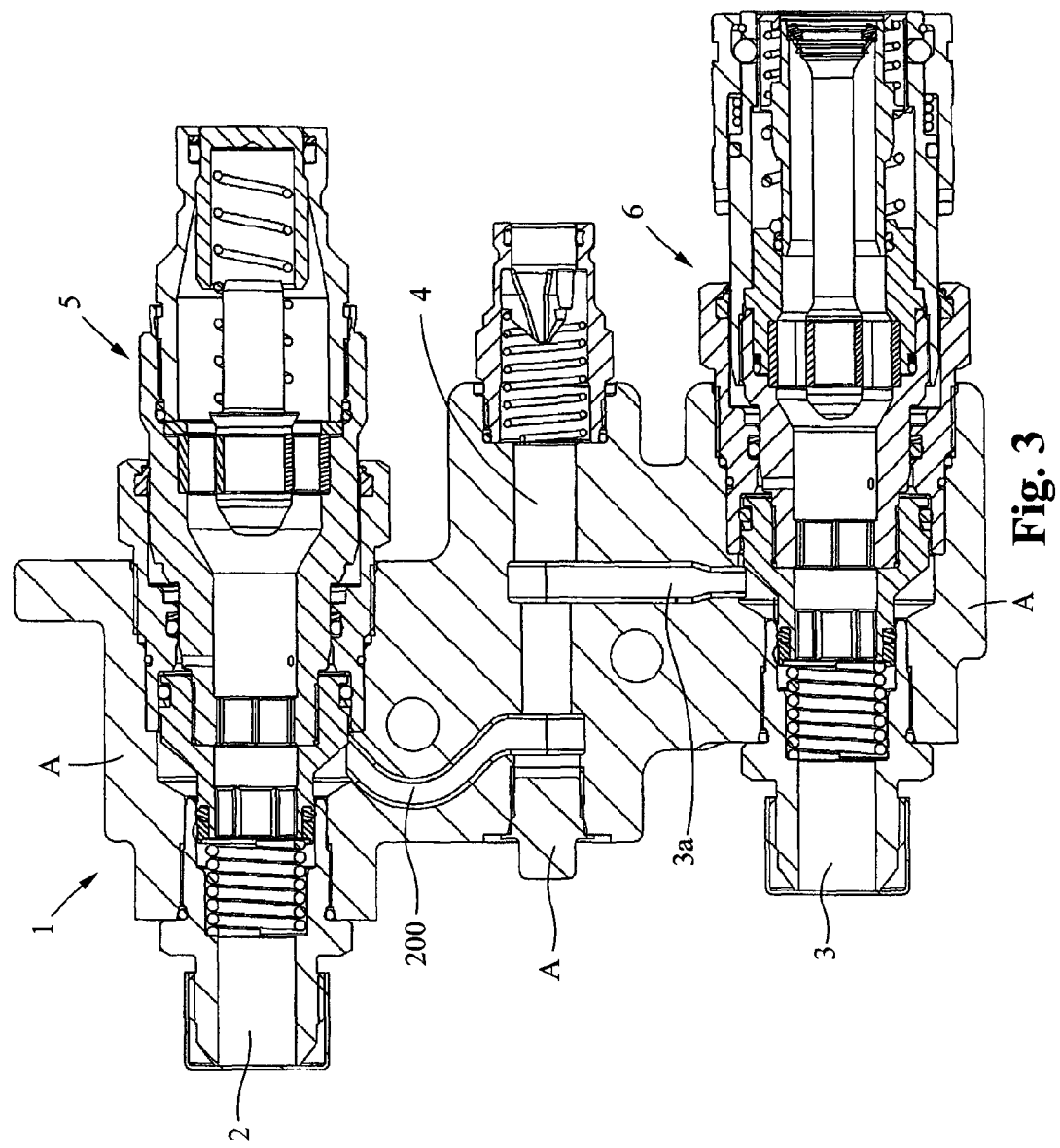
FIG. 3 shows a section, side assembly view taken along a longitudinal plane of the hydraulic assembly according to the present invention.

Due to the particular structure of the coupling, including the decompression means, a significant reduction of the values of the force needed to engage and decompress is obtained. In order to provide reference data, while the operator needs to apply an axial pressure of about 450 N with the device of the type known from the prior art shown in FIGS. 1 and 2 with a residual fluid pressure of 25 MPa, 270 N are needed with the connection assembly according to the present invention, the diameter of lins and couplings being equal and the residual pressure of the fluid being equal, with a considerable advantage in terms of less fatigue for the operator.

Again, the pressurized fluid not coming into contact with the one-block body A, and the general structural simplicity which characterizes the couplings of the connection assembly according to the present invention allows to work with higher working pressures of the fluid, passing from 25 MPa of the device of known type to above 35 MPa of the connection assembly according to the present invention.

We have shown how the hydraulic connection assembly according to the present invention allows to overcome the drawbacks left unsolved by the devices of the type known from the prior art.

In particular, we have shown how the hydraulic assembly according to the present invention allows the operator to connect the hydraulic lines and, possibly, to decompress them by applying a highly lower force, the fluid pressure in the lines being equal.

Furthermore, the hydraulic assembly according to the invention is highly cost-effective and simple to be implemented, thus particularly allowing to avoid laborious and dispersive steps of manually assembling the components and no longer making the final operation of polishing the inner surface of the cast-iron one-block body necessary.

Again, the hydraulic unit according to the present invention requires much shorter manufacturing time than required for making the device of the type known from the prior art, mainly because the further steps of machining at the machine tools after galvanization is no longer needed.

Many changes may be made by a person skilled in the art without departing from the scope of protection of the present invention.

Therefore, the scope of protection of the claims should not be limited by the illustrations or preferred embodiments described by way of example, but rather the claims should include all features of patentable novelty inferable from the present invention, including all features which would be treated as equivalent by a person skilled in the art.

The invention claimed is:

1. A hydraulic connection assembly for connecting one or more first hydraulic lines, of the type comprising a one piece body enclosing at least two second hydraulic lines, and at least one draining line connected to said hydraulic lines with pipes and, further comprising a coupling for each of said first hydraulic lines which is provided with an axially movable element axially movable with respect to said one piece body and adapted to actuate a line decompression means to decompress said second hydraulic lines, wherein said decompression means comprise at least one sealing member positioned on said movable element adapted to hydraulically seal said movable element against a fixed member of said coupling fixed with respect to said one piece body, and at least one or more niches mounted on said fixed member of the coupling, so that said element is movable between a first working position, in which said sealing member hydraulically seals against said fixed member, and a second decompressing position in which said sealing member is positioned at said one or more niches, no longer hydraulically sealing and allowing a fluid to pass to said draining line, and wherein the one piece body has a rear part, said fixed member of said coupling consists of an adapter having a substantially hollow cylindrical shape, said first hydraulic line being inserted into said adapter on which the coupling is placed, said adapter also being fixed with respect to said one piece body, said adapter comprising an end portion, on which said one or more niches are obtained facing the sealing member, and wherein said movable element comprises a substantially hollow, cylindrical rear body slidingly associated with said fixed member and partially inserted therein, and wherein a helical spring is housed at least in part within said one piece body, said helical spring being active between said adapter and said rear body and being configured to oppose the interpenetration of the rear body within the adapter.

2. A hydraulic assembly according to claim 1, wherein said movable element further comprises an inner body coaxially arranged to said rear body and firmly associated therewith, inserted into a ring nut and having a portion inserted into said rear body.

3. A hydraulic assembly according to claim 2, wherein said rear body is axially restrained by the presence of said ring nut, which is firmly connected to the front part of said one-piece body coaxially to the hydraulic line, said ring nut having a substantially cylindrical portion, which is peripherally disposed adjacent the rear body, which thus slides with respect to the ring nut.

4. A hydraulic assembly according to claim 3, wherein said sealing member consists of a substantially annular seal.

5. A hydraulic assembly according to claim 4, wherein said seal is made of polyurethane.

6. A hydraulic assembly according to claim 5, wherein said seal has a cross section profile having at least one cusp in a sealing zone, while a base zone is rounded.

7. A hydraulic assembly according to claim 6, wherein said movable element is axially movable, the axial travel thereof being restrained at the back by an abutment against the adapter and by an abutment against the ring nut, the outer surface of said movable element sliding against the inner surface of said ring nut.

8. A hydraulic assembly according to claim 7, further comprises a connection pipe which allows the pressurized fluid to pass from the hydraulic line to a storing chamber when the movable element axially retracts, and which allows the fluid to flow back from the storing chamber to the second hydraulic lines when the moveable element is moved forward.

* * * * *